United States Patent
Asano

(10) Patent No.: US 7,391,209 B2
(45) Date of Patent: Jun. 24, 2008

(54) ROTATIONAL POSITION SENSOR, COMPOUND ROTATIONAL POSITION SENSOR AND MOTOR OPERATED POWER STEERING DEVICE

(75) Inventor: Takatsugu Asano, Toyohashi (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 0 days.

(21) Appl. No.: 11/683,561

(22) Filed: Mar. 8, 2007

(65) Prior Publication Data

US 2007/0216403 A1    Sep. 20, 2007

(30) Foreign Application Priority Data

Mar. 15, 2006 (JP) ............................. 2006-070173

(51) Int. Cl.
*G01B 7/30* (2006.01)
(52) U.S. Cl. .................................. 324/207.25; 324/257
(58) Field of Classification Search ............ 324/207.25, 324/239–243, 257–258; 73/514.31, 514.39
See application file for complete search history.

(56) References Cited

U.S. PATENT DOCUMENTS 4,416,161 A * 11/1983 Barkhoudarian ....... 73/862.335

FOREIGN PATENT DOCUMENTS

JP    2005-114676    4/2005

* cited by examiner

*Primary Examiner*—Bot LeDynh
(74) *Attorney, Agent, or Firm*—Darby & Darby P.C.

(57) ABSTRACT

It is an object to provide a new rotational position sensor, compound rotational position sensor and motor operated power steering device capable of detecting the rotational position of a rotation detection shaft of which a steering shaft is representative. According to a compound rotational position sensor of the present invention, the number of times a steering shaft has rotated from a reference position is identified by a rotational position sensor and the angle of rotation for one turn of the steering shaft is identified by an encoder. Furthermore, the current angle of rotation of the steering shaft may be specified as an absolute angle of rotation from the reference position based on these two pieces of rotational position information. Furthermore, since a magnetic circuit that is closed by the steering shaft and the base part is formed, the efficiency of the electromagnetic induction is improved, and the electric power consumed can be controlled.

13 Claims, 7 Drawing Sheets

ROTATIONAL POSITION SENSOR, COMPOUND ROTATIONAL POSITION SENSOR AND MOTOR OPERATED POWER STEERING DEVICE

INCORPORATION BY REFERENCE

The present application claims priority under 35 U.S.C. §119 to Japanese Patent Application No. 2006-070173 filed on Mar. 15, 2006, the entire contents of which being hereby incorporated herein by reference.

FIELD OF THE INVENTION

The present invention relates to a rotational position sensor that detects the rotational position of a rotation detection shaft, a compound rotational position sensor and a motor operated power steering device.

BACKGROUND OF THE INVENTION

Encoders and resolvers that detect the rotational position of motor shafts, for example, are widely known for conventional rotational position sensors.

In addition, for rotational position sensors used for steering shafts provided in vehicles, for example, structures where a coiled groove is formed in the worm gear that rotates with the steering shaft, and the swinging arm of a rotational position meter is hooked into this coiled groove are known. With this rotational position sensor, the swing arm is swung and rotated by the worm wheel, and the resistance value for the position meter changes. Furthermore, the rotational position of the steering shaft has been detected based on the position meter output voltage. Such conventional rotational position sensor is described in, for example, Japanese Patent Application Publication No. 2005-114676, at [0023]-[0027] and FIG. 2.

SUMMARY OF THE INVENTION

Incidentally, rotational position sensors have not been limited to motors and vehicles in recent years, and demand has spread for various mechanical products; there has been hope for the development of new rotational positions sensors capable of being installed in these mechanical products.

The present invention is patterned on the circumstances described above, and it is an object thereof to provide a new rotational position sensor, compound rotational position sensor and motor operated power steering device capable of detecting the rotational position of a rotation detection shaft of which a steering shaft is representative.

To achieve the object described above, a rotational position sensor according to one aspect of the invention is one that detects the rotational position of a rotation detection shaft attached rotatably to a base part, wherein there is provided a variable winding coil one end of which is affixed to and wound around the rotation detection shaft and the other end is constituted by a wire or held by the base part and the number of coils of the wire vary according to the rotational position of the rotation detection shaft and a fixed coil capable of electromagnetic induction with the variable winding coil.

Another aspect of the invention is the rotational position sensor according to the above aspect wherein here is provided and alternating current power supply that causes a reference voltage established in advance to pass through either one of the fixed coil and the variable winding coil and a data processing part that calculates the rotational position of the rotation detection shaft based on the induced voltage arising in the other coil and the reference voltage.

Yet another aspect of the invention is the rotational position sensor according to one of the above aspects wherein the rotation detection shaft, along with being constituted of a magnetic substance, is fitted within the fixed coil so as to allow played between them.

Yet another aspect of the invention is the rotational position sensor according to any one of the above aspects wherein the base part, along with being constituted of a magnetic substance has one pair of magnetic path forming opposed walls through which both ends of the rotation detection shaft pass and a magnetic path forming wall that joins the magnetic path forming opposed walls.

Yet another aspect of the invention is the rotational position sensor according to any one of the above aspects wherein the variable the wire of the winding coil is a flat cable and that flat cable is wound around the rotation detection shaft in a coiled shape.

Yet another aspect of the invention is the rotational position sensor according to one of the above aspects wherein the variable the wire of the winding coil is wound around the rotation detection shaft in a spiral shape.

Yet another aspect of the invention is the rotational position sensor according to one of the above aspects wherein there is provided a cable reel capable of winding up the wire of the variable winding coil by reactive force of a spring between the other end of the variable winding coil and the base part.

Yet another aspect of the invention is the rotational position sensor according to one of the above aspects wherein the rotation detection shaft is a steering shaft connected to a steering wheel provided in a vehicle.

Yet another aspect of the invention is the rotational position sensor according to the directly above aspect wherein the variable winding coil is conductively connected to the steering shaft.

A compound rotational position sensor according to yet another aspect of the invention is characterized by being provided with the rotational position sensor according to any one of the above aspects, an encoder capable of detecting the rotational position in one rotation of the rotation detection shaft and a composite computation part that receives both detection results from the rotational position sensor and the encoder, and along with identifying how many rotations the rotation detection shaft has undergone from a reference position by means of the rotational position sensor, identifies the rotational position in one rotation of the rotation detection shaft by means of the encoder and computes the absolute rotational position of the rotation detection shaft from the reference position.

A compound rotational position sensor according to yet another aspect of the invention is characterized by being provided with the rotational position sensor according to one of the above aspects, a resolver capable of detecting the rotational position in one rotation of the rotation detection shaft and a composite computation part that receives both detection results from the rotational position sensor and the resolver, and along with identifying how many rotations the rotation detection shaft has undergone from a reference position by means of the rotational position sensor, identifies the rotational position in one rotation of the rotation detection shaft by means of the resolver and computes the absolute rotational position of the rotation detection shaft from the reference position.

A motor operated power steering device according to yet another aspect of the invention is characterized by being provided with the compound rotational position sensor according to the two aspects directly above.

According to the one aspect described above, the wire is wrapped around when the rotation detection shaft rotates, and the number of windings of the variable winding coil change according to rotational position of the rotation detection shaft. Furthermore, by passing electricity through either one of the coils, the fixed coil or the variable winding coil, the induced voltage arising in the other coil varies according to the number of windings of the variable winding coil, so the rotational position of the rotation detection shaft may be identified based on the results of detecting this induced voltage. Specifically, as in the another aspect of the invention, by applying a reference voltage determined in advance to either one of the coils, the fixed coil or the variable winding coil, and causing excitation, the rotational position of the rotation detection shaft may be calculated based on the induced voltage arising in the other shaft and the reference voltage.

According to one of the yet another aspects of the invention, leakage of the magnetic flux generated by passing a voltage through either one of the coils, the fixed coil or the variable winding coil, because it passes through the rotation detection shaft may be suppressed. Furthermore, the magnetic flux passing through the rotation detection shaft passes through the fixed coil and the variable winding coil and gives rise to an induced voltage and the other coil.

According to one of the yet another aspects of the invention, there is passage through the fixed coil and the variable winding coil and formation of a closed magnetic circuit by the rotation detection shaft and base part, so the electromagnetic induction efficiency is increased and the electricity consumed may be controlled.

According to one of the yet another aspects of the invention, when the rotation detection shaft rotates in the direction opposite to the one that winds up the wire, the wire that has been wound up may be smoothly unwound.

According to one of the yet another aspects of the invention, when the rotation detection shaft rotates in the direction opposite to the one that winds up the wire, the wire that has been wound up may be smoothly unwound.

According to one of the yet another aspects of the invention, the wire may be collected compactly because the wire unwound from the rotation detection shaft is wound onto the cable reel, and entangling of the wire may be prevented.

According to one of the yet another aspects of the invention, the rotational position of the steering shaft provided in a vehicle may be detected.

According to one of the yet another aspects of the invention, electricity may be passed through the variable winding coil with the steering shaft as a ground.

According to one of the yet another aspects of the invention, the number of rotations the rotation detection shaft has rotated from a reference position may be identified, and the rotational position of the rotation detection shaft in one rotation may be identified. Furthermore, the absolute position (the number of rotations from the reference position and the rotational position in one rotation) from the reference position for the current rotation detection shaft position may be identified based on this rotational position information.

According to one of the yet another aspects of the invention, the number of rotations the rotation detection shaft has rotated any from the reference position may be identified, and the rotational position of the rotation detection shaft in one rotation may be identified by the resolver. Furthermore, the absolute position (the number of rotations from the reference position and the rotational position in one rotation) from the reference position for the current rotation detection shaft position may be identified based on this rotational position information.

According to the motor operated power steering device in one of the yet another aspects of the invention, there is an improvement in the feeling of the steering over the conventional because multi-rotational position detection varies continuously in analog. In addition, the encoder or responder is combined with a rotational position sensor to improve the resolution of the rotational position detection in the present invention, but the motor operated power steering device may be made more compact and lower in cost than when combined with an earlier rotational position detection device instead of the rotational position sensor. Moreover, the space inside the vehicle may be increased due to increased compactness, and collision safety may be improved.

DETAILED DESCRIPTION OF THE INVENTION

In the following, one embodiment of the present invention will be described based on FIGS. 1-5.

Figure 1:
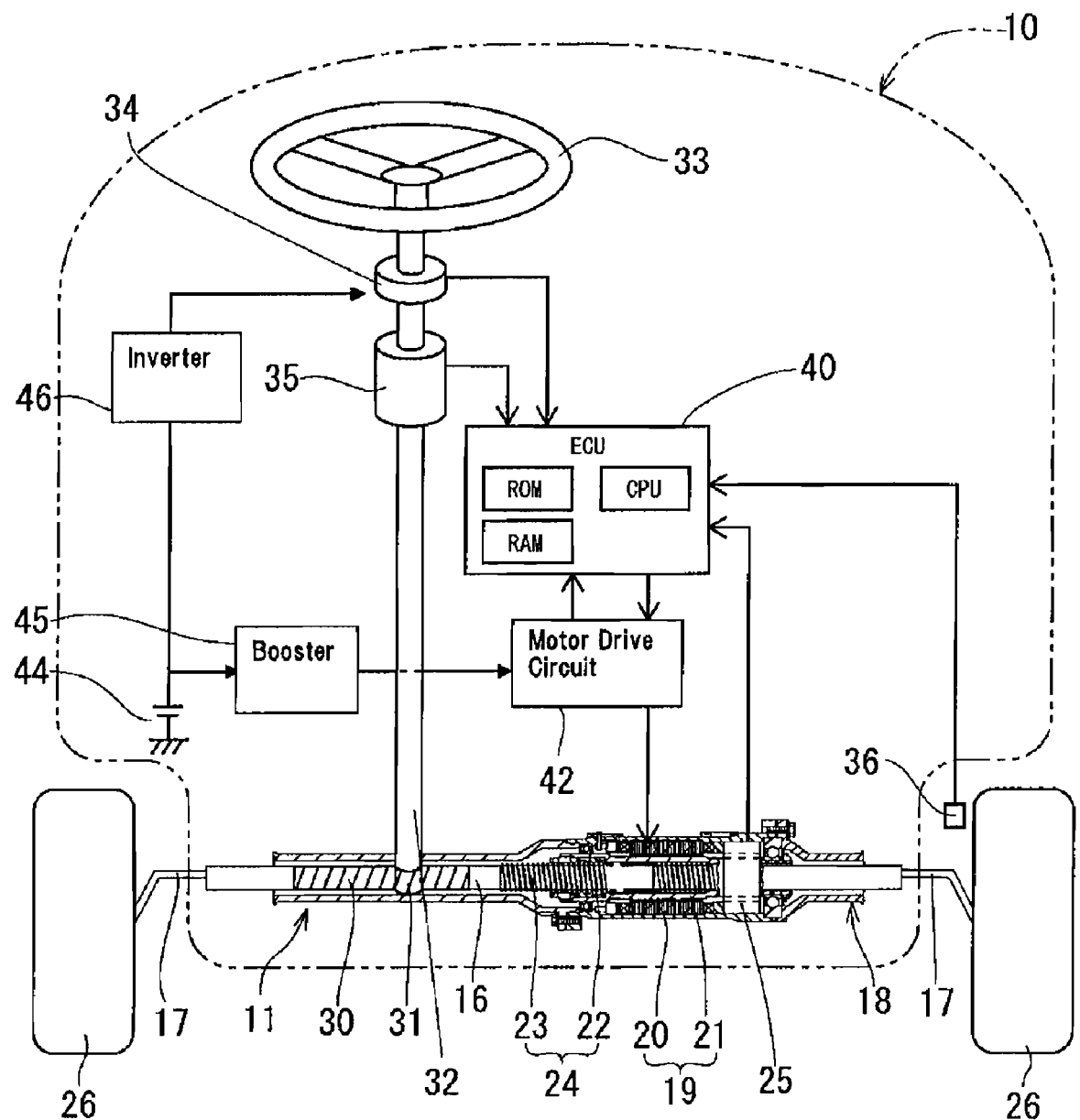
FIG. 1 is a conceptual diagram of a vehicle according to one embodiment of the present invention.

FIG. 1 shows a conceptual diagram of a vehicle 10 where the compound rotational position sensor 34 of the present invention is installed. In the figure, element 11 is a motor operated power steering device and is provided with a rack shaft 16 passing through the inside of a cylindrical housing 18. The cylindrical housing 18 is affixed to the main body of the vehicle 10, and an assisting motor 19 is installed internally in an intermediate part along the axial direction thereof. This assisting motor 19 is provided with a stator 20, mated and affixed on the inside of the cylindrical housing 18 and a cylindrical rotor 21 on the inside of that stator 20. The rack shaft 16 passes through that stator 21 with both the ends exposed from the cylindrical housing 18, and those two ends are linked with the wheels 26, 26 being steered via tie rods 17, 17. In addition, there is provided a position sensor 25 (for example, an encoder or resolver) for detecting the rotational position of the rotor 21 in a position offset to one side of the cylindrical housing 18.

A ball screw nut 22 is attached on the inside surface of the rotor 21. In addition, an intermediate part of the rack shaft 16 in the axial direction forms a ball screw shaft 23. Furthermore, a ball screw mechanism 24 comprises the ball screw nut 22 and ball screw shaft 23, and when the ball screw nut 22 rotates with the rotor 21, the ball screw shaft 23 is driven lineally by the housing, and the wheels 26, 26 being steered are steered by this means. Moreover, a vehicle speed sensor 36 for detecting the speed of the vehicle based on the rotation of the wheels being steered is provided in the vicinity of the wheels 26 being steered.

A rack 30 is formed on a part offset to one side of the rack shaft 16, and a pinion 31 provided on the lower part of the steering shaft 32 is meshed with this rack 30. In addition, a steering wheel 33 for the driver to perform rotary operations is linked to the upper end part of the steering shaft 32, and a torque sensor 35 that detects the load torque applied to the steering shaft 32 and a compound rotational position sensor 34 that detects the absolute rotational angle (equivalent to the "absolute rotational position" of the present invention) from a reference position on the steering shaft 32 (steering wheel 33) are attached in positions offset from the top of the steering shaft 32. The steering shaft 32 here is, for example, composed of a material containing iron and is a magnetic substance, especially ferromagnetic substance.

In FIG. 1, element 40 is an ECU (ECU being an abbreviation for "Electric Control Unit"), and it takes in the detection signals from the position sensor 25, the compound rotational position sensor 34, the torque sensor 35, the vehicle speed sensor 36, and the like. Furthermore, commands are issued to a motor drive circuit 42 according to these detection signals, and the motor drive circuit 42 converts a direct current voltage supplied through a voltage booster circuit 45 from a battery 44 to an alternating current voltage and applies it to the assisting motor 19.

Figure 2:
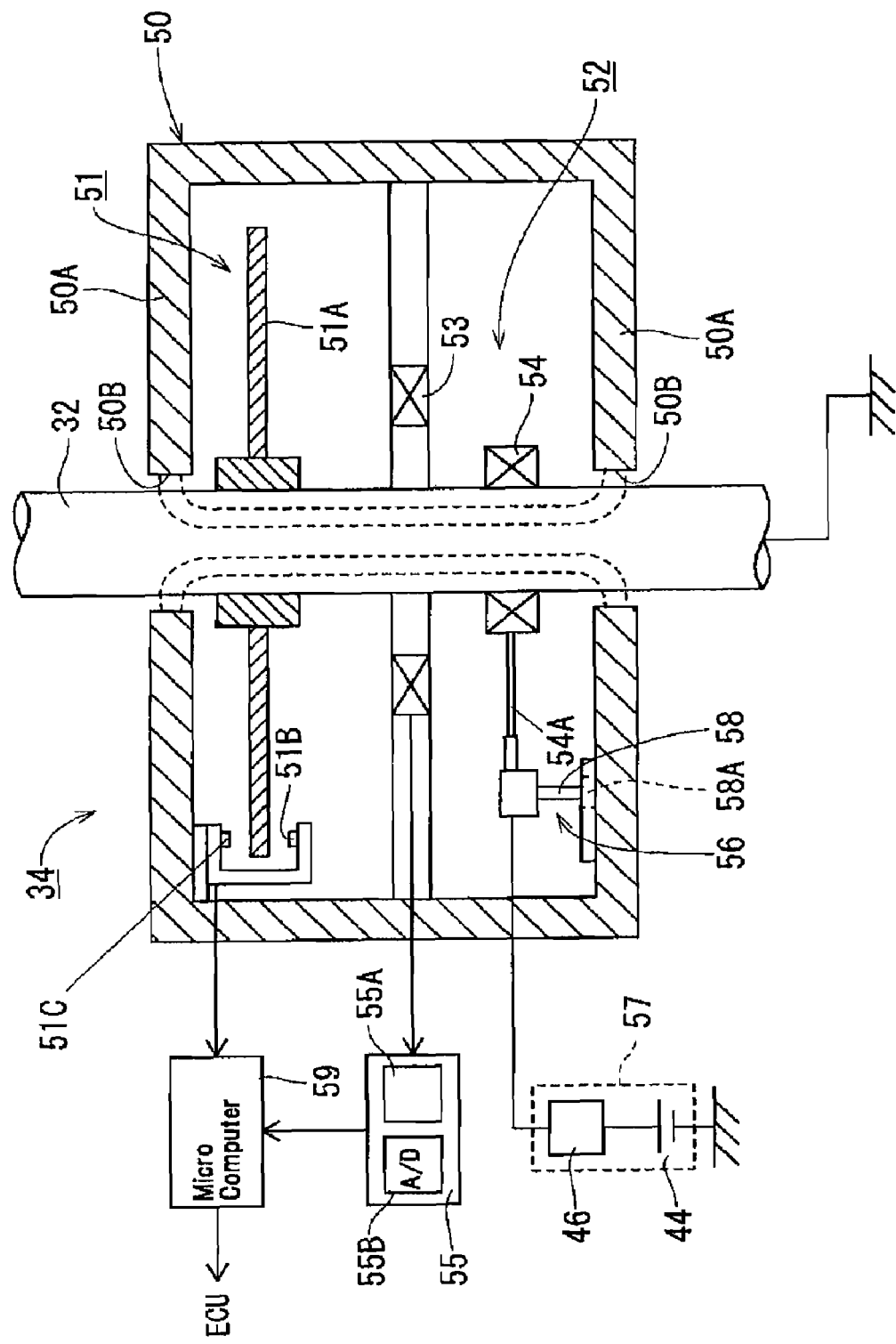
FIG. 2 is a conceptual diagram of the combined rotational position sensor.
Figure 3:
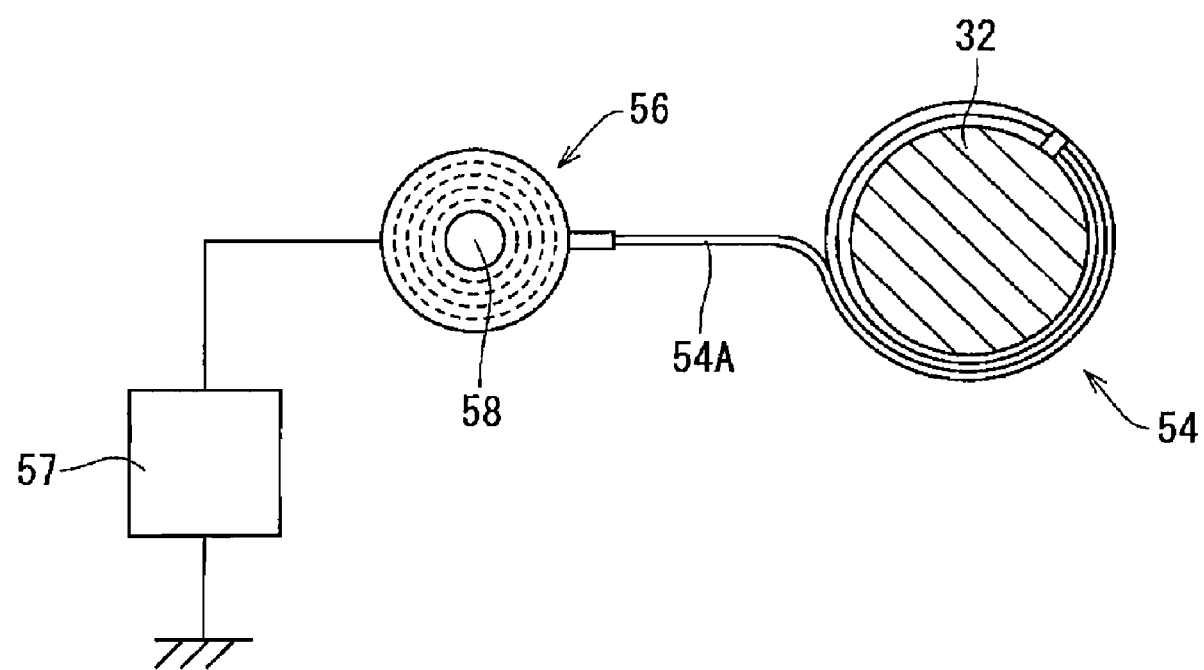
FIG. 3 is a cross-sectional diagram of the steering shaft in a state where the variable winding coil is wound.

The compound rotational position sensor 34 is constituted as follows. As is shown in FIG. 2, the compound rotational position sensor 34 is provided, in the base part 50 which the steering shaft 32 passes through, with an encoder 51 (specifically, an optical absolute encoder) that detects the rotational angle in one rotation of the steering shaft 32 and a rotational position sensor 52 that detects the number of rotations of the steering shaft 32 from a reference position that is set in advance.

The base part 50 is formed from a magnetic substance (specifically, ferromagnetic substance such as a material containing iron, for example, ferrite) and, for example, is a flat cylindrical structure with a bottom on each end (see FIG. 1). In other words, the base part is a structure where a cylindrical wall 50C (corresponding to the "magnetic path forming wall" of the present invention) is joined at the entire periphery of opposing walls 50A, 50A (corresponding to the "magnetic path forming opposed walls" of the present invention) formed as circular plates opposed in the axial direction of the steering shaft 32. Furthermore, shaft pass-through holes 50B, 50B are each formed so as to pass through in the center part of the opposed walls 50A, 50A, and the steering shaft 32 passes through here in a state allowing play.

The encoder 51 is provided with a flat code wheel 51A mated and affixed to the steering shaft 32, and a light emitting device 51B (for example, an LED) and a light receiving device 51C (for example, a phototransistor) are disposed in opposition so as to sandwich this code wheel 51A. Furthermore, the received light signal output by the light receiving device 51C is input by a microcomputer 59 provided in the compound rotational position sensor 34, and the angle of rotation of the code wheel 51A, that is, the angle of rotation in one rotation of the steering wheel 32, is calculated.

The rotational position sensor 52 is disposed below the encoder 51. The rotational position sensor 52 is provided with a fixed coil 53 wrapped around the periphery of the steering shaft 32 and a variable winding coil 54 as its main parts. The fixed coil 53 is affixed on the inside of the base part 50, and is wound with a prescribed number of turns in a state separated from the peripheral surface of the steering shaft 32. A voltage detector 55 formed from an amplifier 55A and an A/D converter 55B is connected to the fixed coil 53. The voltage detection results from the voltage detector 55 are input to the microcomputer 59 provided in the compound rotational position sensor 34, and the microcomputer 59 calculates the number of rotations of the steering shaft 32 based on those detection results. Moreover, the microcomputer 59 corresponds to the "data processing part" of the present invention.

Figure 4:
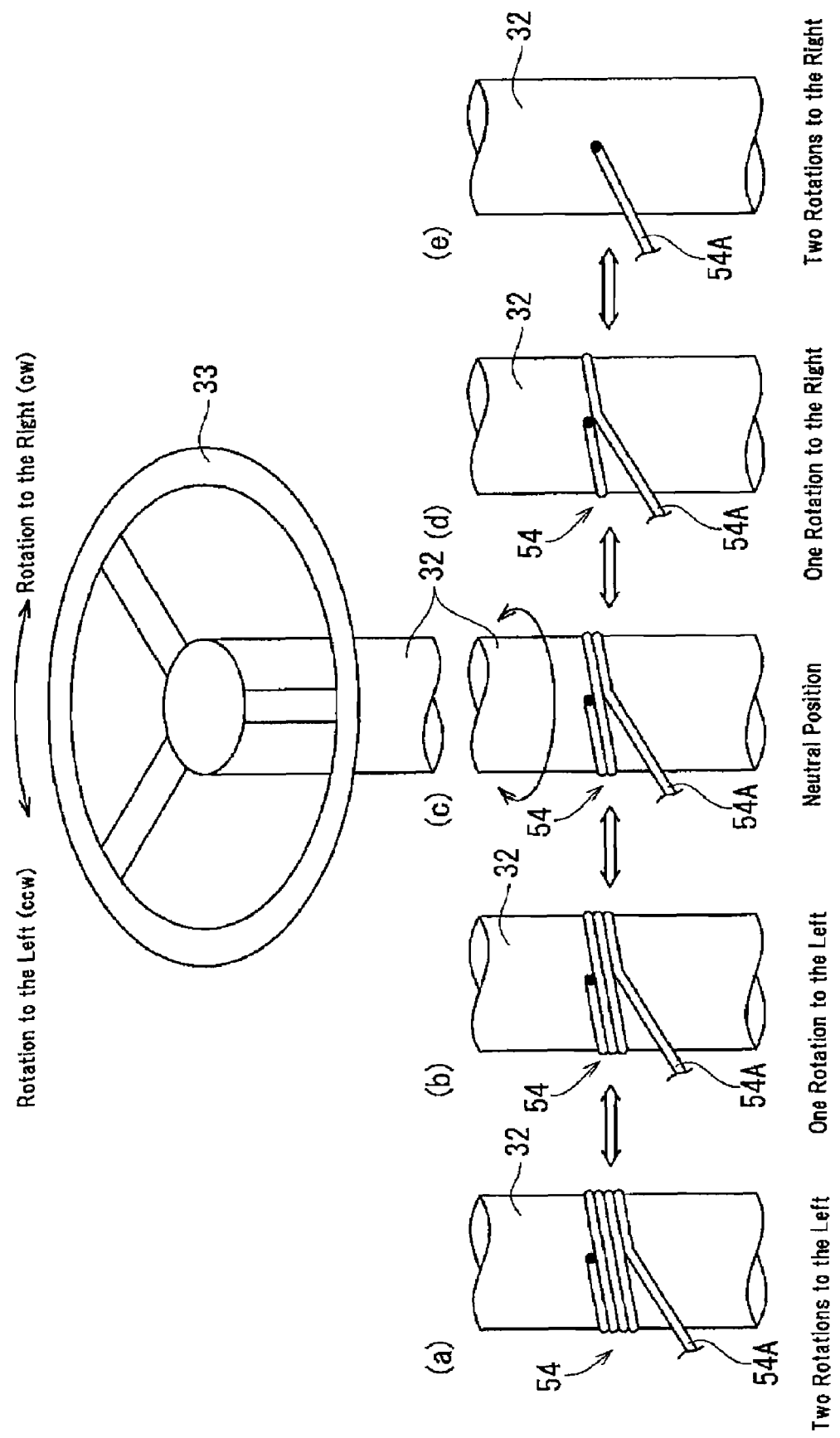
FIG. 4 is a conceptual diagram showing the changes in the number of windings for the variable winding coil.
Figure 5:
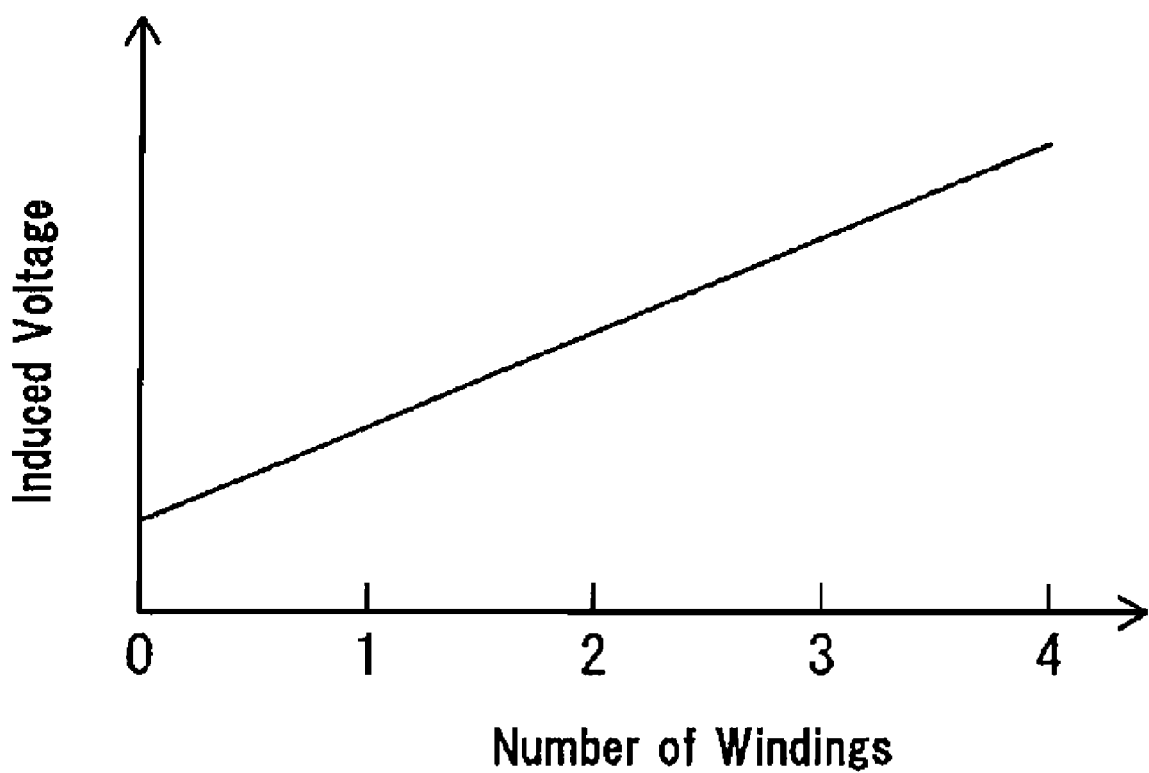
FIG. 5 is a graph showing the relationship between the number of turns for the variable winding coil and the induced voltage arising in the fixed coil.

The variable winding coil 54 is wound around a part of the steering shaft 32 below the position where the fixed coil 53 is wound. The variable winding coil 54 as a structure where, for example, a wire 54A with a circular cross-section (specifically, a copper wire) is wrapped around the peripheral surface of the steering shaft 32, and one end the of the wire 54A is affixed to the peripheral surface of the steering shaft 32. Specifically, the peripheral surface of the steering shaft 32 and one the end of the wire 54A are each provided with a connecting terminal, and by joining these connecting terminals to each other, the wire 54A and the steering shaft 32 are mechanically joined as well as connected with electrical conductivity. Here, the number of turns for the variable winding coil 54 are wound so as to be maximized at the end (position of the limit of rotation for the steering wheel 33) of the rotation on one side for the steering shaft 32 (steering wheel 33), and minimized at the other end of the rotation. Specifically, as is shown in FIG. 4, from the position ("neutral position" in the following) of the steering shaft 32 (steering wheel 33) when the vehicle is moving straight forward, two rotations each, for example, are possible in the opposite directions (turning left and turning right), and the number of turns for the variable winding coil 54 at the neutral position ((c) in FIG. 4) is, for example, "2." Furthermore, when the steering shaft 32 has turned two rotations to the right (clockwise rotation in FIG. 4) from the neutral position, the number of turns the variable winding coil 54 is wound is the minimum, in other words "0" ((e) in FIG. 4), and when it is turned two rotations to the left (rotation in the counterclockwise direction in FIG. 4) from the neutral position, the number of turns wound is the maximum, in other words "4" ((a) in FIG. 4). Here, the wire 54A for the variable winding coil 54 is wound in a spiral shape as shown in FIG. 4.

As is shown in FIG. 2, the other end of the wire 54A is linked to a cable reel 56. The cable reel 56 has, for example, a structure provided with a flange on both the upper and lower ends of the winding core, and the winding core is affixed to a rotating axis 58 that stands out from the lower side opposed wall 50A of the base part 50. The cable reel 56 has a rotational bias in one direction because of the retraction force of a spring 58A (for example, a twisted coil spring or a coiled spring) provided on the base part of the rotating axis 58, and is constituted such that the wire 54A that is unwound from the peripheral surface of the steering shaft 32 by the rotational operation of turning the steering wheel 33 to the right is wound up (see FIG. 3). Moreover, between the cable reel 56 and the steering shaft 32 there may be provided a cable guide that, for example, moves up and down in response to the rotation of the cable reel 56 and wraps the wire 54A that is let off of the cable reel 56 in a spiral shape around the steering shaft 32.

The other end of the wire 54A for the variable winding coil 54 is connected to an alternating current power supply 57. Specifically, the other end of the wire 54A is connected to a battery 44 through an inverter circuit 46, and the inverter circuit 46 converts the direct current voltage of the battery 44 to an alternating current voltage for the reference voltage that has been established in advance and applies it to the variable winding coil 54. Here the current that flows in the variable winding coil 54 finally returns to the battery 44 by way of the steering shaft 32 conductively connected to one end of the wire 54A and metal parts (specifically, the body or the motor operated power steering device) provided in the vehicle 10.

The above has been a description of the constitution of the present embodiment, and next the operation will be described. When the driver carries out rotary operation of the steering wheel 33 in one direction from the neutral position, the steering shaft 32 turns as a unit in the same direction, and the number of turns of the variable winding coil 54 increases.

For example, when a rotational operation to the left (counterclockwise rotation in FIG. 4) from the neutral position is performed on the steering wheel 33 to turn the vehicle 10 to the left, the wire 54A is pulled off of the cable reel 56 and wrapped around the steering shaft 32. Furthermore, when the steering wheel 33 is turned to the left one rotation or two rotations, the number of turns of the variable winding coil 54 on the steering shaft 32 increases from "2" to "3" or "4" (the (a) and (b) states in FIG. 4).

In addition, for example, when a rotational operation to the right (clockwise rotation in FIG. 4) from the neutral position is performed on the steering wheel to turn the vehicle 10 to the right, the wire 54A is unwound from the peripheral surface of the steering shaft 32, and the wire 54A that is sent out is wound up by the cable reel 56. Furthermore, when the steering wheel 33 is turned to the right one rotation or two rotations, the number of turns of the variable winding coil 54 decreases from "2" to "1" or "0" (the (d) and (e) states in FIG. 4).

The absolute angle of rotation from the reference position (in the present embodiment, for example, the position two rotations to the right of the neutral position, in other words state (e) in FIG. 4) for the steering shaft 32 is calculated based on the angle of rotation in one rotation of the steering shaft 32 detected by the encoder 51 and the number of rotations from the reference position of the steering shaft 32 detected by the rotational position sensor 52.

More specifically, the received light signal is output by the light receiving device 51C according to the rotational position of the code wheel 51A in the encoder, and the microcomputer 59 identifies angle of rotation in one rotation (in other words, less than 360°) of the steering shaft based on the received light signal.

In addition, the rotational position sensor 52 detects the number of rotations from the reference position as follows. In other words, when an alternating current voltage is applied to the variable winding coil 54, magnetic flux arises in the steering shaft 32 according to the number of windings of the variable winding coil 54. The magnetic flux extends in the axial direction of the steering shaft 32, passes through variable winding coil 54 and the center part of fixed coil 53 and returns to the steering shaft 32 by way of the wall parts (opposed walls 50A, 50A and cylindrical wall 50C) forming the base part 50. Furthermore, the magnetic flux passes through the fixed coil 53, and as is shown in the graph in FIG. 5, a voltage induced according to the number of windings of the variable winding coil 54 arises in the fixed coil 53. This voltage is detected by a voltage detector 55, and the results of that detection are input to the microcomputer 59. Based on the results for the detection of the induced voltage arising in the fixed coil 53, the alternating current voltage applied to the variable winding coil 54 and the number of windings of the fixed coil 53, the microcomputer 59 calculates the number of windings of the variable winding coil 54 that are wound around the steering shaft 32 and identifies the number of rotations from the reference position for the steering shaft 32 (steering wheel 33) from that number of windings. In other words, for example, when the calculation for the number of windings for the variable winding coil 54 is "3," the number of rotations of the steering shaft 32 from the reference position is identified as being "3" (in other words, a position one rotation to the left from the neutral position).

Furthermore, the microcomputer 59 calculates the absolute angle of rotation of the steering shaft 32 (steering wheel 33) from the reference position by bringing together in the angle of rotation in one rotation of the steering shaft 32 detected by the encoder 51 and the number of rotations from the reference position of the steering shaft 32 detected by the rotational position sensor 52. In other words, the number of rotations and the number of degrees from the reference position of the angle of rotation for the current rotational position of the steering shaft 32 are identified.

Specifically, letting the angle of rotation in one rotation, which is detected by the encoder 51, be θ (less than 360°) and the number of rotations detected by the rotation position sensor 52, be n, the absolute angle of rotation P of the steering shaft 32 from the reference position is identified by the following equation.

$$P = \theta + 360 \cdot n$$

Here, since the microcomputer 59 receives the detection results from both the encoder 51 and the rotational position sensor 52 and calculates the absolute rotational position of the steering shaft 32, it corresponds to the "composite computation part" of the present invention.

According to the present embodiment, the number of times the steering shaft 32 has rotated from the reference position is identified by the rotational position sensor 52 and the angle of rotation in one turn of the steering shaft 32 is identified by the encoder 51. Furthermore, the current angle of rotation of the steering shaft 32 may be specified as an absolute angle of rotation from the reference position based on these two pieces of rotational position information. Furthermore, since a magnetic circuit that is closed by the steering shaft 32 and the base part 50 is formed, the efficiency of the electromagnetic induction is improved, and the electric power consumed can be controlled. Furthermore, since the wire 54A sent from the steering shaft 32 is wound onto the cable reel 56, the wire 54A may be collected compactly. Furthermore, since the wire 54A of the variable winding coil 54 is wrapped in a spiral shape, the wire 54A may be sent off of the steering shaft 32 smoothly and is smoothly taken up by the cable reel 56.

In addition, according to the motor operated power steering device 11 of the present embodiment, there is an improvement in the feeling of the steering over the conventional because multi-rotational position detection varies continuously in analog. In addition, the encoder 51 is combined with a rotational position sensor 52 to improve the resolution of the rotational position detection. The motor operated power steering device 11 may be made more compact and lower in cost than when combined with an earlier rotational position detection device (encoder or resolver) instead of the rotational position sensor 52. Moreover, the space inside the vehicle may be increased with the increased compactness, and collision safety may be improved.

Figure 6:
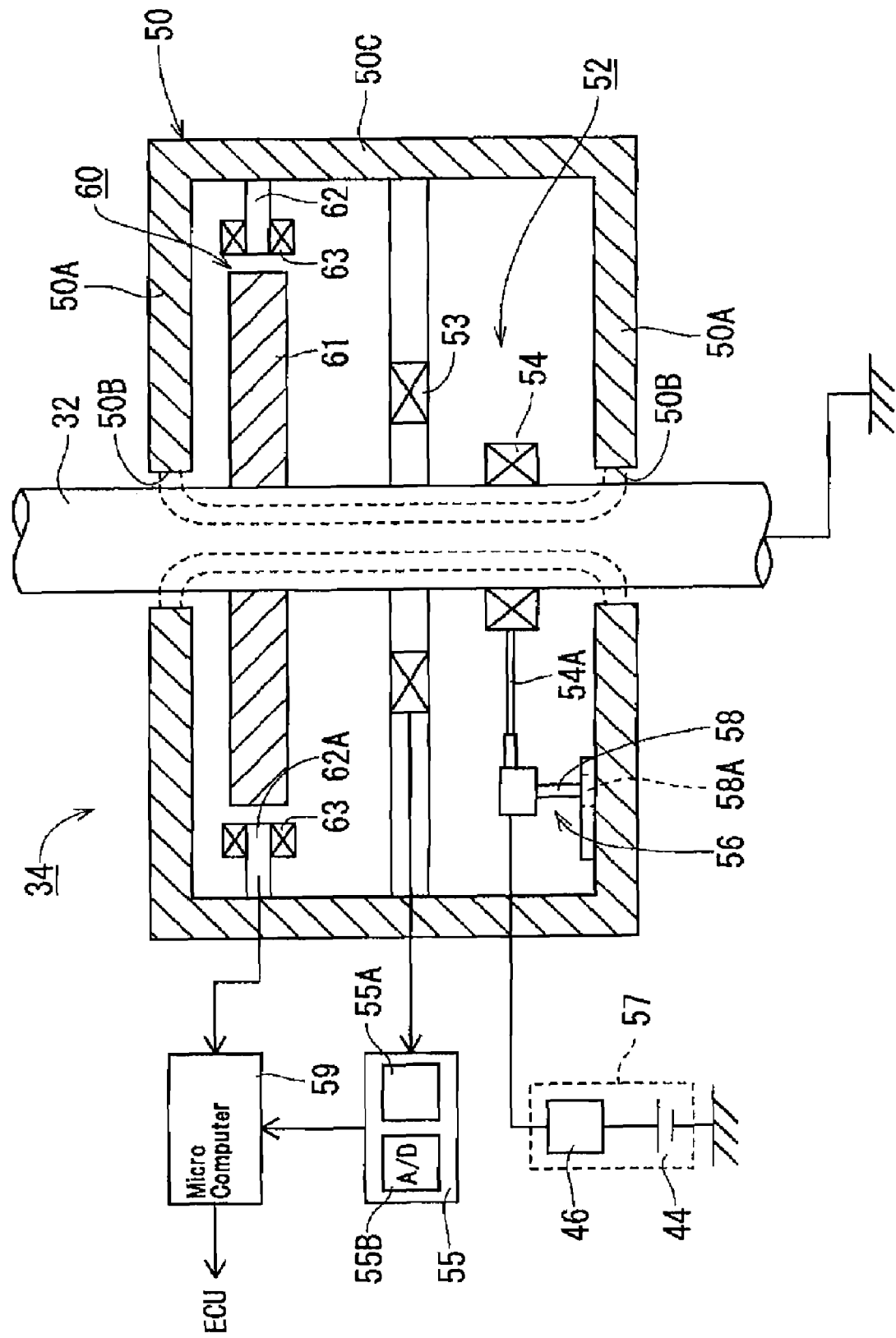
FIG. 6 is a conceptual diagram of the compound position sensor in another embodiment.

As is shown in FIG. 6, another embodiment differs from the one embodiment described above in the point of being provided with a resolver 60 instead of an encoder 51. The resolver 60 is made up of a resolver rotor 61 affixed to the outside surface of the steering shaft 32 and a resolver stator 62 affixed to the inside surface of the base part 50. The resolver stator 62 is, for example, a circular shape, and coils 63 are formed by winding copper wire on each of a plurality of teeth 62A protruding from the inside surface thereof.

On the other hand, the resolver rotor 61 is mated and affixed in a position opposed to the resolver stator 62 on the steering shaft 32. The resolver rotor 61 is formed from a magnetic substance, and the peripheral surface has, for example, a waveform shape. By this means, the resolver rotor 61 and the steering shaft 32 rotate together, and the magnetic characteristics arising in the resolver stator 62 vary. Furthermore, the microcomputer 59 connected to the resolver stator 62 calculates the rotational position of the resolver rotor 61, that is, the rotational position in one rotation of the steering shaft 32, based on the changes in those magnetic characteristics. The other parts of the constitution of the another embodiment are the same as the one embodiment described above. The same effects as for the one embodiment described above also arise because of the another embodiment.

When the resolver 60 is used here, a magnetic shield structure may be provided between the resolver 60 and the rotational position sensor 52, and the resolver 60 may be provided on the outside of the case part 50. The magnetic shield structure may, for example, may be a structure where a circular ring member of a ferromagnetic substance is affixed to the inside of the base part 50. If this is done, the effects of magnetic flux leaking from the various coils 53 and 54 of the rotational position sensor 52 may be controlled.

The present invention is not limited to the embodiments described above, and for example, the embodiments that are described below are also included in the technical scope of the present invention. Furthermore, various changes other than those described below may be made and implemented within a scope that does not deviate from the gist.

Figure 7:
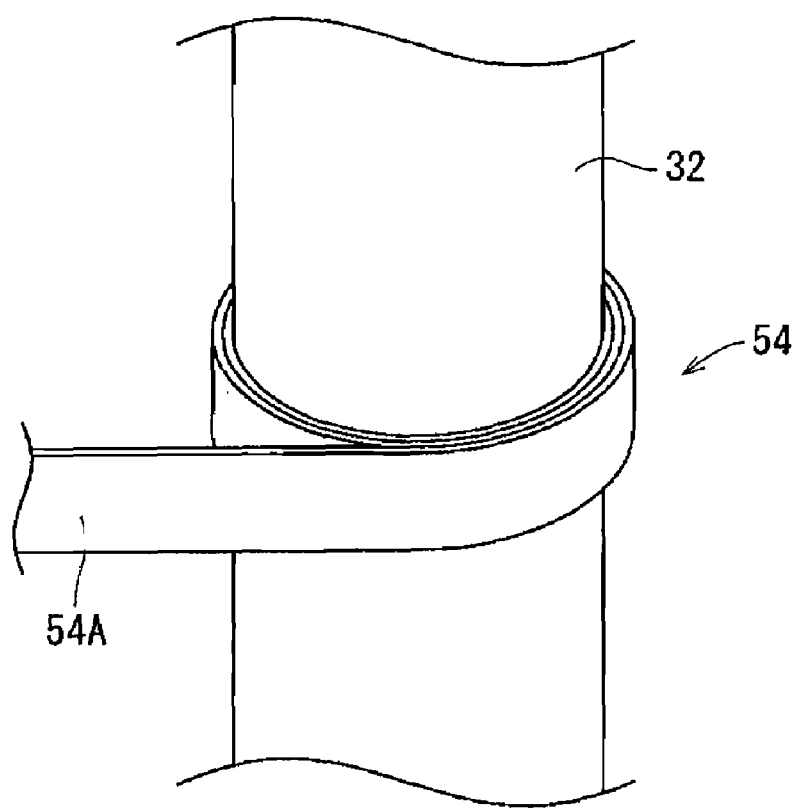
FIG. 7(a) is a perspective view of the variable winding coil according to one of embodiments.
FIG. 7(b) is a side view of the variable winding coil according to one of embodiments.
Figure 7:
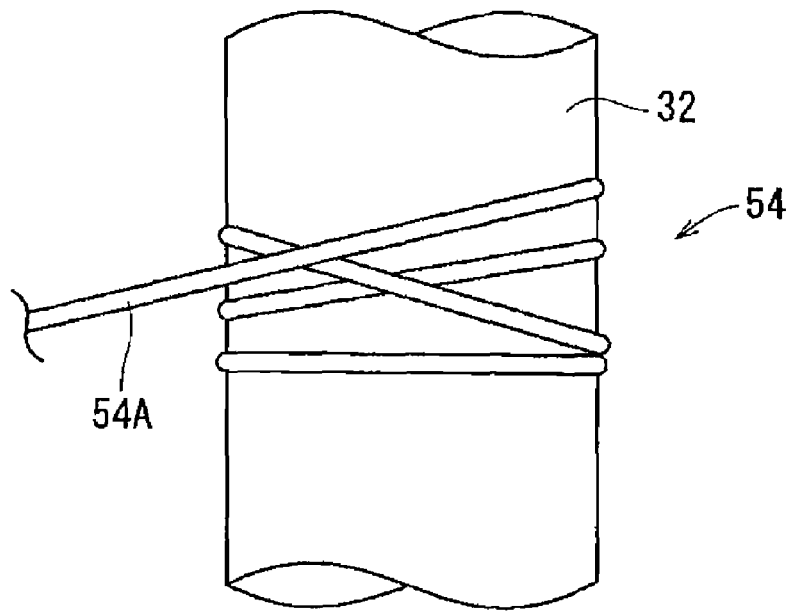

In the embodiments described above, the wire 54A of the variable winding coil 54 is wound around the steering shaft 32 and a spiral shape, but as is shown in FIG. 7(*a*), the wire 54A for the variable winding coil 54 may be made a flat cable, and that flat cable maybe wound around the steering shaft 32 in a coil shape. Even with this constitution, the wire 54A may be sent off of the steering shaft 32 smoothly and wound onto the cable reel 56 smoothly. Moreover, the variable winding coil 54 need not always be wound in a coiled shape or spiral shape, and for example as is shown in FIG. 7(*b*), the wire 54A may cross along the way.

The fixed coil 53 may be connected to the alternating current power supply 57, and on the other hand, the variable winding coil 54 may be connected to the voltage detector 55 and the microcomputer 59; the induced voltage arising in the variable winding coil 54 may be detected by applying the alternating current voltage to the fixed coil 53, and the rotational position (number of rotations) from the reference position of the steering shaft 32 may be identified based on that in boost current and the alternating current.

The structure of the base part 50 is not limited to the cylindrical structure with a bottom on each end as in the embodiments described above. For example, it may have a structure where a space is opened in the circumferential direction of one pair of opposed walls 50A, 50A, and they are joined by a plurality of vertical walls.

In the embodiments described above, the variable winding coil 54 and the fixed coil 53 are disposed on the steering shaft 32 displaced along the axial direction, but the fixed coil 53 may be disposed on the outside of the variable winding coil 54 in the direction of the diameter.

In the embodiments described above, the constitution is such that the variable winding coil 54 and the steering shaft 32 are connected conductively, and the current flowing through the variable winding coil 54 returns to the battery 44 by way of the metal parts of the vehicle 10, but the variable winding coil 54 may be directly connected to the negative terminal of the battery 44 by a wire. Moreover, the conductive connection of the variable winding coil 54 to the steering shaft 32 may be simplified to negative wiring.

The fixed coil 53 need not always pass through the steering shaft 32.

In the embodiments described above, the constitution is such that the number of turns wound for the variable winding coil 54 is a minimum of "0," but the number of turns may be at the minimum "1" or more.

It is preferable for the encoder 51 to be an absolute encoder, but it may also be an incremental encoder. In addition, it is not limited to being an optical type, and may also be a magnetic encoder. Moreover, when a magnetic encoder is used, a structure where the encoder is provided on the outside of the base part 50 and where there is a magnetic shield (for example, the circular ring member described in the another embodiment) between the encoder and the rotational position sensor 52 may also be provided. If this is done, the effects of magnetic flux leaking from the various coils 53 and 54 provided in the rotational position sensor 52 may be prevented.

When only the number of rotations of the steering shaft 32 is necessary, only the rotational position sensor 52 may be provided, and the constitution need not provide an encoder 51 or resolver 60.

The rotational position sensor 52 and the compound rotational position sensor 34 may be used other than for the steering shaft 32 of the vehicle 10 for the detection of the absolute rotational position of a rotation detection shaft provided in a robot or industrial machine.

The rotational position sensor 52 and the compound rotational position sensor 34 may be used for the detection of the rotational position of the steering shaft 32 in a steer-by-wire system.

The invention claimed is:

1. A rotational position sensor that detects the rotational position of a rotation detection shaft attached rotatably to a base part, comprising:
   a variable winding coil constituted by a wire, one end of which is affixed to and wound around the rotation detection shaft and the other end of which is held by the base part, a number of coils of the wire being configured to vary according to the rotational position of the rotation detection shaft; and
   a fixed coil capable of electromagnetic induction with the variable winding coil.

2. The rotational position sensor according to claim 1, further comprising:
   an alternating current power supply that causes a reference voltage established in advance to pass through either one of the fixed coil and the variable winding coil; and
   a data processing part that calculates the rotational position of the rotation detection shaft based on the induced voltage arising in the other coil and the reference voltage.

3. The rotational position sensor according to claim 1, wherein the rotation detection shaft, along with being constituted of a magnetic substance, is fitted within the fixed coil so as to allow play between them.

4. The rotational position sensor according to claim 1, wherein the base part, along with being constituted of a magnetic substance, has one pair of magnetic path forming opposed walls through which both ends of the rotation detection shaft pass, and a magnetic path forming wall that joins the magnetic path forming opposed walls.

5. The rotational position sensor according to claim 1, wherein the variable winding coil is a flat cable and that flat cable is wound around the rotation detection shaft in a coiled shape.

6. The rotational position sensor according to claim 1, wherein the wire of the variable winding coil is wound around the rotation detection shaft in a spiral shape.

7. The rotational position sensor according to claim 1, further comprising a cable reel capable of winding up the wire of the variable winding coil by a reactive force of a spring between the other end of the variable winding coil and the base part.

8. The rotational position sensor according to claim 1, wherein the rotation detection shaft is a steering shaft connected to a steering wheel provided in a vehicle.

9. The rotation position sensor according to claim 8, wherein the variable winding coil is conductively connected to the steering shaft.

10. A compound rotational position sensor comprising:
the rotational position sensor according to claim 1;
an encoder capable of detecting the rotational position in one rotation of the rotation detection shaft; and
a composite computation part that receives both detection results from the rotational position sensor and the encoder, and along with identifying how many rotations the rotation detection shaft has undergone from a reference position by means of the rotational position sensor, identifies the rotational position in one rotation of the rotation detection shaft by means of the encoder and computes the absolute rotational position of the rotation detection shaft from the reference position.

11. A compound rotational position sensor comprising:
the rotational position sensor according to claim 1;
a resolver capable of detecting the rotational position in one rotation of the rotation detection shaft; and
a composite computation part that receives both detection results from the rotational position sensor and the resolver, and along with identifying how many rotations the rotation detection shaft has undergone from a reference position by means of the rotational position sensor, identifies the rotational position in one rotation of the rotation detection shaft by means of the resolver and computes the absolute rotational position of the rotation detection shaft from the reference position.

12. A motor operated power steering device comprising the compound rotational position sensor according to claim 10.

13. A motor operated power steering device comprising the compound rotational position sensor according to claim 11.

* * * * *